(12) United States Patent
Roy

(10) Patent No.: US 6,729,224 B1
(45) Date of Patent: May 4, 2004

(54) SERVICE BRAKE ACTUATOR HAVING A UNITARY PUSHROD ASSEMBLY WITH A BUSHING THEREFOR

(75) Inventor: James F. Roy, Muskegon, MI (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 10/018,194

(22) PCT Filed: May 11, 2000

(86) PCT No.: PCT/US00/12919

§ 371 (c)(1),
(2), (4) Date: Nov. 30, 2001

(87) PCT Pub. No.: WO00/74991

PCT Pub. Date: Dec. 14, 2000

Related U.S. Application Data
(60) Provisional application No. 60/137,882, filed on Jun. 7, 1999.

(51) Int. Cl.[7] .................................................. F01B 7/00
(52) U.S. Cl. ............................................. 92/63; 384/24
(58) Field of Search ........................ 92/99, 101, 130 R, 92/63; 384/24, 32

(56) References Cited

U.S. PATENT DOCUMENTS 5,392,691 A * 2/1995 Schultz ........................... 92/63

FOREIGN PATENT DOCUMENTS

DE        3603145     *  6/1987

* cited by examiner

Primary Examiner—F. Daniel Lopez
(74) Attorney, Agent, or Firm—St. Onge Steward Johnston Reens LLC

(57) ABSTRACT

A service brake actuator (10) having a unitary pushrod assembly (42) in combination with a bushing (62) having a separable portion that permits the assembly of the service brake actuator without the need for the clevis (48) to be removably mounted to the pushrod.

14 Claims, 3 Drawing Sheets

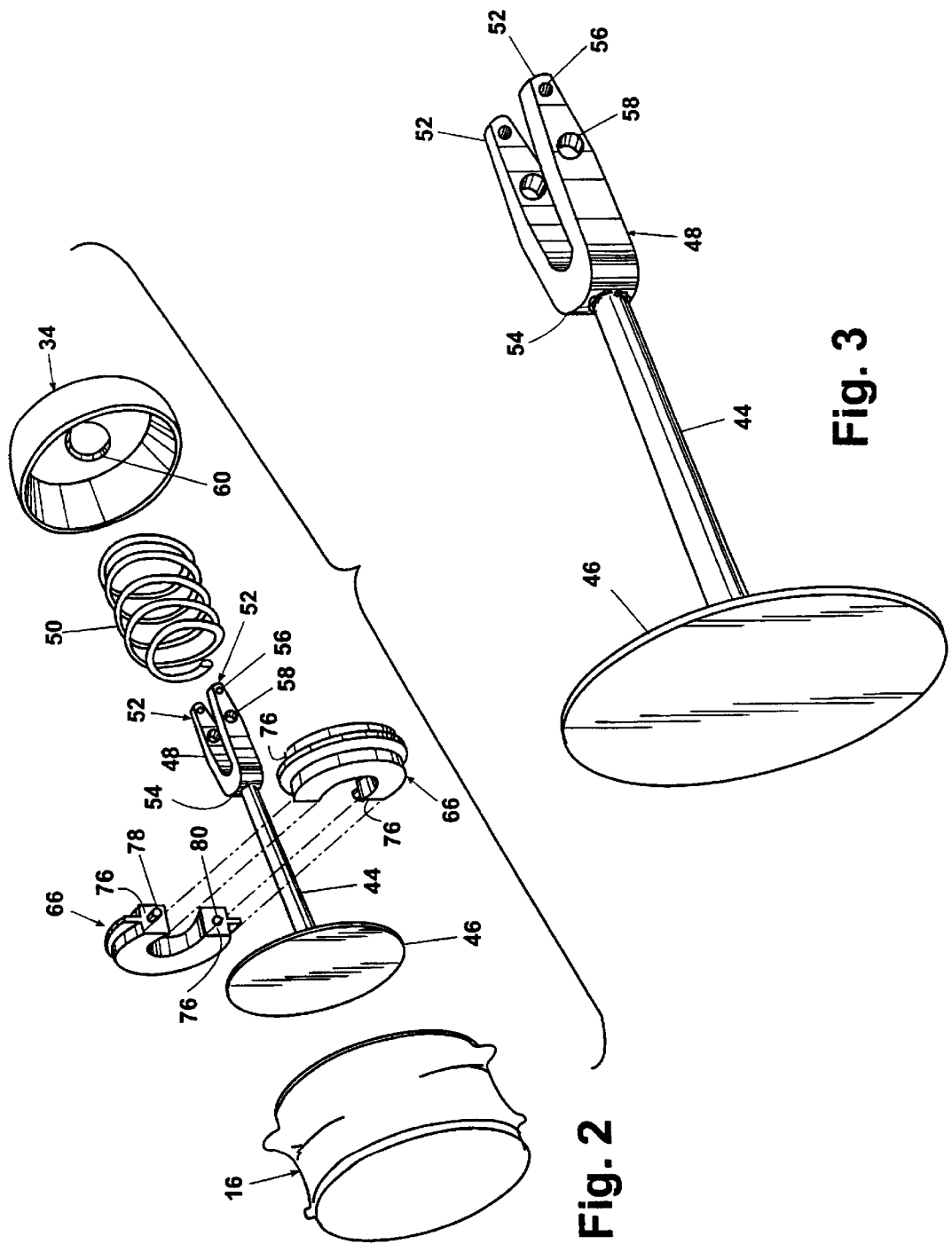

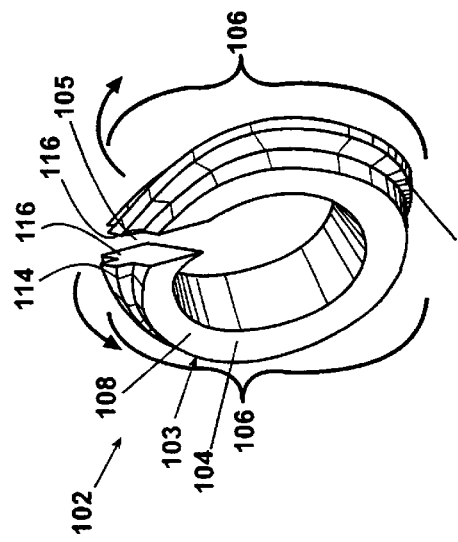
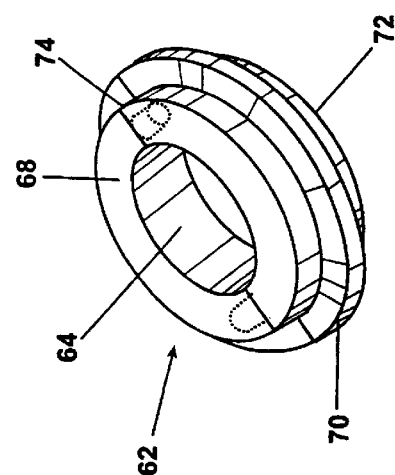
Fig. 4
Fig. 5
Fig. 6

SERVICE BRAKE ACTUATOR HAVING A UNITARY PUSHROD ASSEMBLY WITH A BUSHING THEREFOR

RELATED APPLICATION

This application claims the benefit of International patent application No. PCT/US00/12919, filed May 11, 2000, which claims the benefit of U.S. Provisional Patent Application No. 60/137,882, filed Jun. 7, 1999.

BACKGROUND OF THE INVENTION

1. Field of the Invention

This invention relates to an improvement in a service brake actuator for air-operated vehicle brakes; and, more particularly, to a service brake actuator having a unitary pushrod assembly with a separable bushing capable of being assembled about the pushrod for sealing the pushrod with respect to the service brake actuator.

2. Related Art

Air-operated brake actuators are well known in the vehicle industry, especially in the heavy-duty truck industry where the air-operated brake actuators are controlled by a source of pressurized air to apply the operational brakes and emergency brakes of the heavy-duty truck and/or trailer. A typical air-operated brake actuator comprises a spring brake actuator in combination with a service brake actuator. The service brake actuator comprises a housing that is divided into a pressure chamber and a pushrod chamber in which is disposed one portion of a pushrod assembly.

The pushrod assembly includes a pressure plate mounted on one end of the pushrod and adapted to abut the diaphragm. A clevis is mounted to the other end of the pushrod and is adapted to connect to a brake lever. The reciprocation of the pushrod with respect to the housing moves the brake lever to apply or release the brakes, depending on the direction of movement. Pressurized air is introduced into the service brake pressure chamber to move the position of the diaphragm and thereby reciprocate the pushrod assembly, resulting in the application or release of the brake, depending on the amount of air introduced or exhausted from the service brake pressure chamber.

The spring brake actuator has a similar construction to that of the service brake actuator in that it typically includes a diaphragm dividing the spring brake actuator into a spring chamber and a pressure chamber. A large force compression spring is housed within the spring chamber between the housing and the diaphragm and is typically separated from the diaphragm by a pressure plate in abutting relationship with the diaphragm. An actuating rod extends from the pressure plate through the diaphragm and into the service brake pressure chamber. The introduction of compressed air into the spring brake pressure chamber compresses the spring and withdraws the actuator from contact with the service brake diaphragm. When it is desired to apply the parking brakes or the emergency brakes, the pressurized air is exhausted from the spring brake pressure chamber whereby the large force compression spring expands, bringing the actuator into contact with the diaphragm to extend the pushrod from the service brake actuator and apply the brakes.

In prior service brake actuators, such as that disclosed in U.S. Pat. No. 5,002,164, issued Mar. 26, 1991, which is incorporated by reference, the pushrod and the clevis of the pushrod assembly are typically assembled after the pushrod has been inserted through an opening in the service brake actuator housing by threading a tapped opening of the clevis onto a threaded end of the pushrod and fixing the relative position of the clevis and pushrod by one or more lock nuts or the clevis was welded to pushrod end. A bushing encircled the pushrod and sealed the pushrod relative to the housing opening through which the pushrod reciprocated. The bushing included a body sized to fit within the service brake opening and a flange sized to abut the service brake housing. A pushrod opening extended through the body. The return spring bore against the bushing to bias the bushing against the service brake housing.

In the prior art, the clevis could not be mounted onto the end of the pushrod prior to the insertion of the pushrod through the housing because the clevis is too large to pass through pushrod opening in the bushing, although it is small enough to pass through the housing opening.

Given the high volume and great price competitiveness of the air-operated brake actuator marketplace, there is a continuous desire to simplify the manufacture and assembly of the air-operated brake actuators. To that end, there is a desire to manufacture and/or assemble the pushrod assembly into a unitary element prior to installation of the pushrod assembly, preventing the use of the current bushing.

SUMMARY OF THE INVENTION

The invention relates to an air-operated brake actuator for applying and releasing a brake comprising a housing having first and second portion portions between which is positioned a diaphragm, dividing the interior of the housing into a pushrod chamber and a pressure chamber. The housing second portion has a pushrod opening that extends between the pushrod chamber and the exterior of the housing. A pushrod comprising a shaft having first and second ends, a pressure plate mounted on the first end of the shaft, and a coupling mounted on the second end of the shaft, is mounted within the pushrod chamber such that the pressure plate lies within the pressure chamber, the shaft extends through the pushrod opening, and the coupling is located exteriorly of the second portion. The coupling has a maximum dimension sized to permit passage through the pushrod opening. A bushing encircles the shaft and is positioned within the pushrod opening. The bushing comprises a body sized to be received within the pushrod opening and a shaft opening in the body for receiving the shaft. The bushing has at least one separable portion that enables radial access to the shaft opening, thereby permitting the assembly of the bushing to the shaft after the clevis and pressure plate are mounted to the shaft.

Preferably, the shaft opening maximum dimension is sized to prohibit the passage of the coupling therethrough. The bushing can comprise two arcuate portions which when assembled form the body with an outer circumferential portion received within the pushrod opening and an inner circumferential portion forming the shaft opening. Each arcuate portion can terminate in opposing end portions, with one end portion having a key and the other end portion having a keyhole sized to receive the key to couple together the arcuate portions. The arcuate portions can further include a flange extending beyond the body and which abuts the interior of the housing second portion when the body is received within the pushrod opening.

In another aspect, the invention relates to a method of assembling an air operated brake actuator comprising a housing having an first portion and a second portion, with a pushrod opening in the second portion. A diaphragm spans the housing dividing the housing into a pushrod chamber and a pressure chamber. A pushrod is partially received within the pushrod chamber. The pushrod comprises a shaft, a pressure plate mounted on one end of the shaft, and a coupling mounted on another end of the shaft. The coupling has a maximum dimension sized to permit passage through the pushrod opening. A bushing having a body sized to be received within the pushrod opening and a shaft opening in the body. The bushing comprises at least one portion that is separable from the bushing a sufficient amount to permit the radial insertion of the shaft into the shaft opening.

The method comprising the steps inserting the coupling through the pushrod opening, separating the seperable portion from the bushing to form a radial passage to the pushrod opening, inserting the shaft into the shaft opening through the radial opening, positioning the body in the actuator opening, positioning the diaphragm between the first and second housing portions, and securing the first and second housing portions together.

Preferably, the step of inserting of the shaft into the shaft opening precedes the insertion of the coupling through the pushrod opening. The separable portion is then assembled to the body. The assembly of the separable body portion includes inserting a key on each of the parts into a corresponding keyhole on another part.

BRIEF DESCRIPTION OF THE DRAWINGS

In the drawings:

FIG. 2 is an assembly view of the service brake actuator of FIG. 1;

FIG. 3 is a perspective view of the pushrod assembly of FIG. 1;

FIG. 4 is a perspective view of the bushing of FIG. 1;

FIG. 5 is a perspective view of a second embodiment of the bushing according to the invention; and FIG. 6 is a perspective view of a third embodiment of the bushing according to the invention.

DETAILED DESCRIPTION

Figure 1:
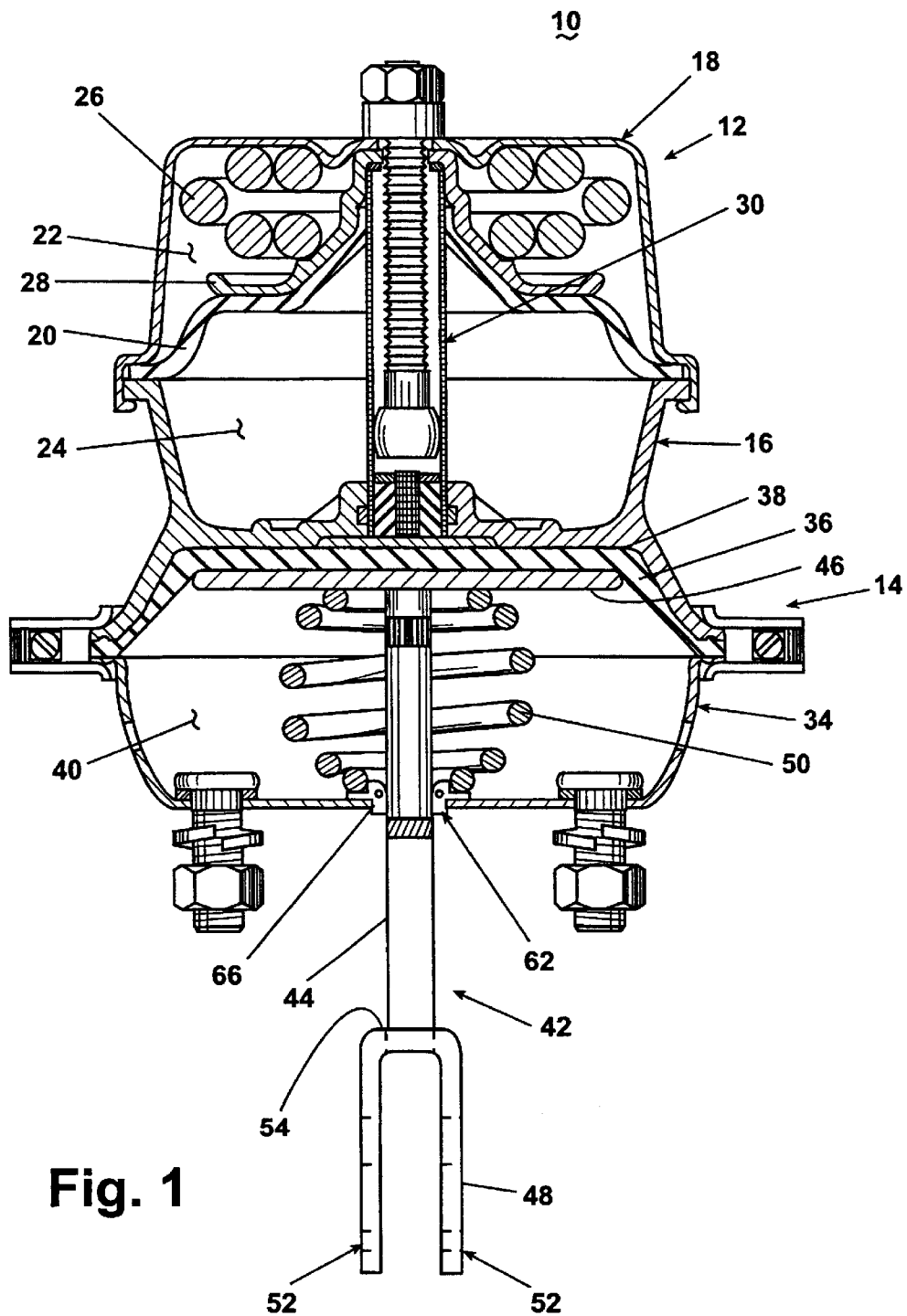
FIG. 1 is a sectional view of the combination spring brake actuator and service brake actuator including unitary pushrod assembly in combination with the bushing according to the invention.

FIG. 1 illustrates an air-operated brake actuator 10 comprising a spring brake actuator 12 in combination with a service brake actuator 14. In the particular structure shown in FIG. 1, the spring brake actuator 12 and service brake actuator 14 both share a common adapter housing 16, which forms a portion of the housing for each of the spring brake actuator 12 and the service brake actuator 14.

The spring brake actuator 12 further comprises a cup-shaped head 18 that connects to the adapter housing 16 to form the housing for the spring brake actuator. A diaphragm 20 is trapped between the joined edges of the head and the adapter housing 16 to divide the spring brake actuator 12 into a spring chamber 22 and a pressure chamber 24.

A large force compression spring 26 is disposed within the spring chamber 22 between the head 18 and a pressure plate 28 abutting the diaphragm 20. The pressure plate 28 mounts a hollow actuator rod 30, which extends through the diaphragm 20 and into the upper portion of the service brake actuator 14.

The pressure chamber 24 is fluidly connected to a source of compressed air (not shown). The introduction of the compressed air into the pressure chamber 24 moves the diaphragm 20 and pressure plate 28 upwardly to compress or cage the large force compression spring 26 against the head.

When the large force compression spring 26 is caged, the actuator rod 30 is withdrawn to its uppermost position with respect to the service brake actuator 14. When the pressurized air in the pressure chamber 24 is exhausted, the actuator rod 30 extends its greatest distance into the service brake actuator 14.

The service brake actuator 14 comprises a housing 16 formed by a cup-shaped bottom housing 34 that is connected to the adapter housing 16. A diaphragm 36 is trapped between the joined edges of the bottom housing 34 and the adapter housing 16 to divide the service brake actuator 14 into a pressure chamber 38 and a pushrod chamber 40. The pressure chamber 38 is connected to a source of compressed air (not shown) and operates in a similar manner as described above with respect to the spring brake actuator pressure chamber 24.

A pushrod assembly 42 is partially disposed within the pushrod chamber. The pushrod assembly comprises a shaft 44 having one end mounted to a pressure plate 46 and a clevis 48 welded to the other end of the shaft 44.

A return spring 50 is disposed between the bottom housing 34 and the pressure plate 46 to urge the pushrod assembly 42 toward the dividing wall of the adapter housing 16. A bushing 62 is positioned within an opening in the bottom housing 34 and receives the shaft 44 through a shaft opening 64 to seal the pushrod chamber with respect to the shaft 44 while providing a bearing surface for the reciprocating movement of the shaft 44 during normal operation. The return spring 50 biases the bushing 62 into contact with the bottom housing 34.

The clevis 48 has a generally U-shaped cross section and comprises opposing fingers 52 connected by a bight portion 54. A pair of openings 56, 58 are provided in each of the fingers 52 for use in connecting the clevis 48 to the lever of a brake system, such as an S-cam brake assembly. The end of the shaft 44 abuts and is welded to the bight portion 54 of the clevis 48. The clevis 48 and shaft 44 extend through a pushrod opening 60 in the bottom housing 34.

The bushing 62 has a body 68 in which is defined the axially oriented shaft opening 64. An annular shoulder 70 extends from the bushing body 68 and is greater in diameter than the bottom housing opening 34. The body 68 is effectively divided by the shoulder 70 so that the housing side 72 of the body 68 has a greater diameter than the pushrod chamber side 74. Also, the shaft opening 64 is tapered at the pushrod chamber side 74 so as not to provide a sharp edge within the stroke path of the shaft 44.

The bushing 62 is formed from two pieces, which are generally illustrated as arcuate segments 66, preferably half a circle, which terminate in ends 76. A protrusion or key 78 extends from the ends of each of the bushing halves. A blind opening or keyhole 80 extends into the opposite end of each half so that the key 78 of one half is received within the keyhole 80 of the other half to fix the relative positions of the two halves when assembled.

Referring to FIG. 2, the service brake actuator 14 is assembled by sliding the clevis 48 and shaft of the unitary pushrod assembly through the coil return spring 50 and inserting the shaft 44 and clevis 48 through the bottom housing opening 34 until the clevis 48 extends through the bottom housing 34. In this position, the two halves 66 of the bushing 62 are positioned on opposite sides of the shaft 44 and pressed together until the keys 78 are received in the corresponding keyhole 80. The separability of the two halves effectively permits the shaft to be inserted radially into the shaft opening. The housing side of the bushing 62 is inserted within the bushing opening. The pushrod assembly 42 is drawn towards the bottom housing 34 to effectively cage the spring and remove the pressure plate 46 from interfering with the positioning of the diaphragm 36 between the adapter housing 16 and the bottom housing 34, which are clamped together with the peripheral edge of the diaphragm held therebetween to complete the assembly.

FIG. 5 illustrates a second embodiment bushing 82 that is substantially similar to the bushing 62 in that the bushing 82 comprises arcuate portions 86, which, when assembled form a body 88 having an annular shoulder 90 and an axial shaft opening 84. The main difference between the second embodiment bushing 82 and first embodiment bushing 62 is that the arcuate portions 86 are connected by a hinge 101, permitting the separation of the arcuate portions 86 by pivoting the arcuate portions relative to the hinge 101. The hinge is preferably a living hinge integrally formed with the arcuate portions but could be any other suitable structure, including a mechanical connection such as tape. In the preferred form, the hinge 101 is a living hinge extending between adjacent portions of the annular shoulder. The ends of the arcuate portions opposite the hinge include a key 98 and a keyhole 100, respectively.

The separability of the arcuate portions 86 of the bushing 82 permit the bushing to be assembled about the shaft 44 after the pressure plate 46 and clevis 48 are mounted to the shaft. The assembly of the bushing to the shaft merely requires the arcuate portions 86 to be rotated about the hinge 101 until the arcuate portions are separated a sufficient distance that the shaft 44 can be radially inserted into the pushrod shaft opening 84 of the bushing 82. The arcuate portions 86 are then rotated toward each other until the key 98 is received within the keyhole 100. With the bushing now assembled around the shaft 44, the bushing 82 can be slid along the shaft 44 until it is positioned within the shaft opening 60.

FIG. 6 illustrates a third embodiment bushing 102 that is substantially similar to the bushings 62, 82 in that the bushing 102 comprises a body having defining a shaft opening. The main difference between the third embodiment bushing 82 and first and second embodiment bushings is that the body 108 is not formed by physically distinct arcuate portions, but is formed by a ring 103 having a slit 105 defined by opposing end surfaces 116. The ring can be thought of as having two conceptual arcuate portions 106 with one of their ends permanently connected and the other end being formed by the end surfaces 116. The end surfaces 116 are preferably oriented at an angle relative to the axis of the shaft opening 104. Thus, when the bushing 102 is assembled, the return spring will bias the end surfaces 116 together to seal the slit 105 and prevent the ingress contaminates into the pushrod chamber.

To assemble the bushing about the shaft of the pushrod, the arcuate portions are grasped near the end surfaces and moved axially in opposite directions, as indicated by the direction arrows in FIG. 6, separating the ends a sufficient distance for the shaft 44 to be radially received between the end surfaces and into the shaft opening. Once the shaft 44 is inserted, the end surfaces 116 are released and the inherently resiliency of the bushing 102, which is preferably made of Delrin, results in the end surfaces returning substantially to their undeflected postion. To the extent the end surfaces 116 do not completely return to their undeflected position, the force of the return spring 50 is sufficient to bias the end surfaces into contact when the brake is assembled.

One of many alternatives to the above-described assembly is that the bushing can be assembled to the shaft after the insertion of the shaft and clevis through the return spring but before the insertion of the clevis through the bushing opening.

Regardless of the point at which the bushing is assembled to the unitary pushrod assembly, the invention reduces the number of steps involved in assembling the service brake actuator by permitting the installation of a unitary pushrod assembly because of the multi-piece structure of the bushing. The simplification of the service brake actuator assembly advantageously reduces the complexity of the pushrod assembly in that it is no longer needed since the clevis can now be fixedly secured to the shaft, preferably by welding, instead of removably secured as found in the prior art service brake actuators reducing the part count. The cumulative advantages associated with the multi-piece bushing results in a service brake actuator having reduced part count and a quicker assembly time, both of which provide a competitive advantage.

While the invention has been specifically described in connection with certain specific embodiments thereof, it is to be understood that this is by way of illustration and not of limitation, and the scope of the appended claims should be construed as broadly as the prior art will permit.

What is claimed is:

1. An air-operated brake actuator for applying and releasing a brake, the brake actuator comprising:

a housing having a first portion and a second portion, with an actuator opening in the second portion;

a diaphragm spanning the housing and dividing the interior of the housing into an actuator chamber and pressure chamber for receiving and exhausting pressurized fluid to apply and release the brakes;

an actuator comprising a shaft having first and second ends, a pressure plate mounted on the first end of the shaft, and a coupling mounted on the second end of the shaft, the pressure plate being located within the actuator chamber, the shaft extending through the actuator opening, and the coupling located exteriorly of the second portion and having a maximum dimension sized to permit passage through the actuator opening, a plug comprising multiple parts which is selectively assembled about the shaft after it is inserted through the housing opening, and, when the multiple parts are assembled, the plug defines an outer periphery sized to seal the actuator opening and a shaft opening extending through the plug having a maximum dimension sized to permit the axial sliding of the shaft, the multiple parts comprising two arcuate portions, which when assembled form a ring-shaped body having an outer circumferential portion received within the actuator opening and an inner circumferential portion forming the shaft opening and each arcuate portion terminating in opposing end portions, with one end portion having a key and the other end portion having a keyhole sized to receive the key, wherein, when the arcuate portions are assembled, the end portions abut and the key of one arcuate portion is received within the keyhole of the other arcuate portion to couple together the arcuate portions; and a web extending between corresponding end portions of the arcuate portions to form a hinge about which the arcuate portions is selectively pivoted to permit the movement of the arcuate portions between a closed position and an open position where the shaft can be laterally received within the shaft opening.

2. An air-operated brake actuator for applying and releasing a brake, the brake actuator comprising:

a housing having a first portion and a second portion, with an actuator opening in the second portion;

a diaphragm spanning the housing and dividing the interior of the housing into an actuator chamber and pressure chamber for receiving and exhausting pressurized fluid to apply and release the brakes;

an actuator comprising a shaft having first and second ends, a pressure plate mounted on the first end of the shaft, and a coupling mounted on the second end of the shaft, the pressure plate being located within the actuator chamber, the shaft extending through the actuator opening, and the coupling located exteriorly of the second portion and having a maximum dimension sized to permit passage through the actuator opening; and a plug comprising multiple parts which is selectively assembled about the shaft after it is inserted through the housing opening, and, when the multiple parts are assembled, the plug defines an outer periphery sized to seal the actuator opening and a shaft opening extending through the plug having a maximum dimension sized to permit the axial sliding of the shaft, the multiple parts comprising two arcuate poritions, which when assembled form a ring-shaped body having an outer circumferential portion received within the actuator opening and an inner circumferential portion forming the shaft opening; and wherein each arcuate portion includes a flange extending beyond the body and which abuts the interior of the housing second portion when the body portion is received within the actuator opening.

3. The air-operated brake actuator according to claim 2, wherein the flange is an arcuate lip, which forms an annular lip when the arcuate portions are assembled.

4. The air-operated brake actuator according to claim 2, wherein each arcuate portion further comprises an arcuate projection, which forms an annular projection that functions as a spring seat that lies within the housing when the brake is assembled.

5. An air-operated brake actuator for applying and releasing a brake, the brake actuator comprising:

a housing having a first portion and a second portion, with an actuator opening in the second portion;

a diaphragm spanning the housing and dividing the interior of the housing into an actuator chamber and pressure chamber for receiving and exhausting pressurized fluid to apply and release the brakes;

an actuator comprising a shaft having first and second ends, a pressure plate mounted on the first end of the shaft, and a coupling mounted on the second end of the shaft, the pressure plate being located within the actuator chamber, the shaft extending through the actuator opening, and the coupling located exteriorly of the second portion and having a maximum dimension sized to permit passage through the actuator opening; and a plug comprising multiple parts which is selectively assembled about the shaft after it is inserted through the housing opening, and, when the multiple parts are assembled, the plug defines an outer periphery sized to seal the actuator opening and a shaft opening extending through the plug having a maximum dimension sized to permit the axial sliding of the shaft; and wherein the plug further comprises a flange that abuts the interior of the housing second portion when the plug is mounted to the housing.

6. The air-operated brake actuator according to claim 5, wherein the flange is an annular lip.

7. The air-operated brake actuator according to claim 5, wherein the plug further comprises a spring seat that lies within the housing when the plug is mounted to the housing.

8. An air-operated brake actuator for applying and releasing a brake, the brake actuator comprising:

a housing having a first portion and a second portion, with an actuator opening in the second portion;

a diaphragm scanning the housing and dividing the interior of the housing into an actuator chamber and pressure chamber for receiving and exhausting pressurized fluid to apply and release the brakes;

an actuator comprising a shaft having first and second ends, a pressure plate mounted on the first end of the shaft, and a coupling mounted on the second end of the shaft, the pressure plate being located within the actuator chamber, the shaft extending through the actuator opening, and the coupling located exteriorly of the second portion and having a maximum dimension sized to permit passage through the actuator opening; and a plug comprising multiple parts which is selectively assembled about the shaft after it is inserted through the housing opening, and, when the multiple parts are assembled, the plug defines an outer periphery sized to seal the actuator opening and a shaft opening extending through the plug having a maximum dimension sized to permit the axial sliding of the shaft; and having a slit extending from the plug exterior to the shaft opening and the multiple parts are moved to open the slit and permit the lateral insertion of the shaft into the shaft opening. the slit formed by the interface between adjacent end portions of the multiple parts; and wherein the multiple parts comprise two parts, each part having corresponding first and second ends, with the interface between the first ends defining the slit and the second ends being integrally connected.

9. An air-operated brake actuator for applying and releasing a brake, the brake actuator comprising:

a housing having a first portion and a second portion, with an actuator opening in the second portion;

a diaphragm spanning the housing and dividing the interior of the housing into an actuator chamber and pressure chamber for receiving and exhausting pressurized fluid to apply and release the brakes;

an actuator comprising a shaft having first and second ends, a pressure plate mounted on the first end of the shaft, and a coupling mounted on the second end of the shaft, the pressure plate being located within the actuator chamber, the shaft extending through the actuator opening, and the coupling located exteriorly of the second portion and having a maximum dimension sized to permit passage through the actuator opening;

a plug comprising an outer periphery sized to seal the actuator opening and a shaft opening extending through the plug having a maximum dimension sized to permit the axial sliding of the shaft, and a slit extending from the plug outer periphery to the shaft opening to divide the plug into first and second portions that are moveable relative to each other between a closed position where the slit is minimized and an open position where slit is expanded a sufficient amount such the shaft can be laterally inserted into shaft opening through the slit, the first and second portions comprising two arcuate portions, which when the plug is in the closed position form a ring-shaped body having an outer circumferential portion received within the actuator opening and an inner circumferential portion forming the shaft opening and each arcuate portion terminates in opposing end portions, with one end portion having a key and the other end portion having a keyhole sized to receive the key, wherein, when the arcuate portions are assembled, the end portions abut and the key of one arcuate portion is received within the keyhole of the other arcuate portion to couple together the arcuate portions; and a web extending between corresponding end portions of the arcuate portions to form a hinge about which the arcuate portions can be pivoted to permit the movement of the arcuate portions between a closed position and an open position where the shaft can be laterally received within the shaft opening.

10. An air-operated brake actuator for applying and releasing a brake, the brake actuator comprising:

a housing having a first portion and a second portion, with an actuator opening in the second portion;

a diaphragm spanning the housing and dividing the interior of the housing into an actuator chamber and pressure chamber for receiving and exhausting pressurized fluid to apply and release the brakes;

an actuator comprising a shaft having first and second ends, a pressure plate mounted on the first end of the shaft, and a coupling mounted on the second end of the shaft, the pressure plate being located within the actuator chamber, the shaft extending through the actuator opening, and the coupling located exteriorly of the second portion and having a maximum dimension sized to permit passage through the actuator opening;

a plug comprising an outer periphery sized to seal the actuator opening and a shaft opening extending through the plug having a maximum dimension sized to permit the axial sliding of the shaft, and a slit extending from the plug outer periphery to the shaft opening to divide the plug into first and second portions that are moveable relative to each other between a closed position where the slit is minimized and an open position where slit is expanded a sufficient amount such the shaft can be laterally inserted into shaft opening through the slit; and wherein the plug further comprises a flange extending beyond the body and which abuts the interior of the housing second portion when the body portion is received within the actuator opening.

11. The air-operated brake actuator according to claim 10, wherein the flange is an arcuate lip, which forms an annular lip when the arcuate portions are assembled.

12. The air-operated brake actuator according to claim 10, wherein the flange further comprises an annular projection that functions as a spring seat that lies within the housing when the brake is assembled.

13. An air-operated brake actuator for applying and releasing a brake, the brake actuator comprising:

a housing having a first portion and a second portion, with an actuator opening in the second portion;

a diaphragm spanning the housing and dividing the interior of the housing into an actuator chamber and pressure chamber for receiving and exhausting pressurized fluid to apply and release the brakes;

an actuator comprising a shaft having first and second ends, a pressure plate mounted on the first end of the shaft, and a coupling mounted on the second end of the shaft, the pressure plate being located within the actuator chamber, the shaft extending through the actuator opening, and the coupling located exteriorly of the second portion and having a maximum dimension sized to permit passage through the actuator opening;

a plug comprising an outer periphery sized to seal the actuator opening and a shaft opening extending through the plug having a maximum dimension sized to permit the axial sliding of the shaft, and a slit extending from the plug outer periphery to the shaft opening to divide the plug into first and second portions that are moveable relative to each other between a closed position where the slit is minimized and an open position where slit is expanded a sufficient amount such the shaft can be laterally inserted into shaft opening through the slit; and wherein each of the first and second portions comprise corresponding first and second ends, with the interface between the first ends defining the slit and the second ends being integrally connected.

14. An air-operated brake actuator for applying and releasing a brake, the brake actuator comprising:

a housing having a first portion and a second portion, with an actuator opening in the second portion;

a diaphragm spanning the housing and dividing the interior of the housing into an actuator chamber and pressure chamber for receiving and exhausting pressurized fluid to apply and release the brakes;

an actuator comprising a shaft having first and second ends, a pressure plate mounted on the first end of the shaft, and a coupling mounted on the second end of the shaft, the pressure plate being located within the actuator chamber, the shaft extending through the actuator opening, and the coupling located exteriorly of the second portion and having a maximum dimension sized to permit passage through the actuator opening; and a plug comprising body which has an outer periphery sized to seal the actuator opening and a shaft opening extending through the plug having a maximum dimension sized to permit the axial sliding of the shaft, the body having a slit extending therethrough that forms an acute angle relative to a centerline axis for the shaft opening such that the body is laterally selectively attachable about the shaft.

* * * * *